United States Patent [19]

Henderson et al.

[11] Patent Number: 5,466,157

[45] Date of Patent: Nov. 14, 1995

[54] METHOD OF SIMULATING A SEISMIC SURVEY

[75] Inventors: Gerald J. Henderson; Peter C. Johnson; Lawrence B. Sullivan, all of Plano, Tex.

[73] Assignee: Atlantic Richfield Company, Los Angeles, Calif.

[21] Appl. No.: 384,356

[22] Filed: Feb. 2, 1995

Related U.S. Application Data

[63] Continuation of Ser. No. 714,272, Jun. 12, 1991, abandoned.

[51] Int. Cl.$^6$ ..................................................... G01V 1/00
[52] U.S. Cl. ........................... 434/299; 364/421; 395/120; 434/150
[58] Field of Search ..................... 364/420–422; 340/853.1; 434/130, 150–152, 276, 299; 367/73; 395/119, 120

[56] References Cited

U.S. PATENT DOCUMENTS

| | | | |
|---|---|---|---|
| 2,185,924 | 1/1940 | Pereira | 434/152 X |
| 3,487,133 | 12/1969 | Lindsay | 434/152 X |
| 4,479,204 | 10/1984 | Silverman | 367/47 |
| 4,707,787 | 11/1987 | Savit et al. | 364/420 |
| 4,879,696 | 11/1989 | Kostelnicek et al. | 367/76 |
| 4,953,142 | 8/1990 | Rimmer | 367/73 |
| 4,961,154 | 10/1990 | Pomerantz | 395/119 |
| 4,964,103 | 10/1990 | Johnson | 367/53 |
| 4,991,095 | 2/1991 | Swanson | 364/421 |

FOREIGN PATENT DOCUMENTS

| | | | |
|---|---|---|---|
| 1497714 | 7/1969 | Germany | 434/151 |
| 2032301 | 1/1972 | Germany | 434/299 |
| 1293752 | 2/1987 | U.S.S.R. | 434/299 |
| 1399805 | 5/1988 | U.S.S.R. | 434/299 |

Primary Examiner—Richard J. Apley
Assistant Examiner—Glenn E. Richman
Attorney, Agent, or Firm—Vinson & Elkins

[57] ABSTRACT

A method of forming a scale model for simulation of a seismic survey is disclosed. The model includes layers which are formed by way of stereolithography or similar methods, from a CAD data base; the precision of the formation of the layers allows for construction of the model without adhesives between all layers for structural integrity of the model, although adhesive or a wetting agent may be used, depending upon the desired simulation experiment. The model also includes molded layers which are poured, injected, or otherwise introduced in liquid form. The liquid may then be solidified, or may remain in liquid form, depending upon the survey. These molded layers may be made into the prefabricated layers where appropriate, or during the process of constructing the model. Simulation of the survey may be made by imparting acoustic energy thereinto and detecting the same. The disclosed method allows for iteration of the simulation in an efficient manner, as certain of the layers may be removed and replaced with others, due to the precision of the prefabrication process. Further iteration may efficiently be made by reconstruction of the entire model, due to the efficiency of the formation of the various layers.

16 Claims, 7 Drawing Sheets

METHOD OF SIMULATING A SEISMIC SURVEY

This application is a continuation of application Ser. No. 07/714,272, filed Jun. 12, 1991, now abandoned.

This invention is in the field of seismic prospecting, and is more specifically directed to simulating a seismic survey by forming a scale model of the earth.

BACKGROUND OF THE INVENTION

Conventional prospecting for oil and gas reservoirs is done by imparting acoustic energy into the earth, and detecting the imparted energy after reflection from or refraction through various formations. Analysis of certain attributes of the detected energy, such as travel time, provides an indication of the types and locations of sub-surface formations and interfaces encountered by the energy along its source-receiver path. As a result, a survey of the sub-surface geology can be generated for the region of interest, conventionally in the form of a contour map indicating the location, depth and acoustic velocity of various sub-surface strata. From such maps and surveys, skilled geologists and geophysicists can infer the location and depth of potential hydrocarbon reservoirs.

While conventional analysis of such seismic survey data is successful to a large degree, certain inaccuracies often exist. For example, noise which is picked up by the receivers may mask certain energy, limiting the ability to detect a particular sub-surface interface. Poorly designed surveys can result in spatial aliasing and related undesirable effects. Furthermore, inaccuracies in the estimated acoustic velocity of particular formations, or in other assumptions used in data interpretation, will be manifest as inaccuracies in the resulting survey or contour map. It is not uncommon for errors in the position or depth (or both) of a particular geological structure to have magnitudes in the hundreds of feet.

Due to the likelihood of such errors, a method of verifying the accuracy of a survey would be desirable, at a minimum; a method of actually correcting or adjusting the results of a survey would be especially desirable. Prior to the present invention, the use of models, either numerical or physical, of regions of the earth have been considered to be useful for such verification. Construction of a model of the surveyed region, as indicated by the contour map, followed by the performing of a "seismic" survey on the model, allows for a comparison of the seismic data acquired from the model with that from which the contour map was constructed. Differences in the field seismic data from the model would indicate inaccuracies in the seismic data interpretation process. Re-interpretation of the previously acquired seismic data, or even acquisition of new seismic data from the region of interest, could then be performed to provide a new or adjusted survey of sufficient accuracy that drilling could be performed with reasonable confidence.

Conventional techniques for creating scale models of the earth include the creation of plaster and wood molds to match the shapes in the contour map. The material molded by such molds is generally one of several two-part rubber or plastic materials having the desired physical properties, such as acoustic velocity (compressional, horizontal and vertical shear), density, and other elastic material properties. The layer becomes a mold for the next layer that bonds thereto, with the result being a laminated block of dimensions on the order of one to three feet on a side to represent the surveyed region. Scaled acoustic or ultrasonic sources and detectors are then deployed at the surface of the model, generally near the center of the top surface so that boundary effects at the sides of the model are effectively infinitely distant, and a scaled seismic survey is performed to simulate an actual field survey.

However, these prior scale models have not provided sufficiently accurate information on a timely enough basis to allow for useful verification of the survey information. This is due to the time-consuming and expensive construction of the plaster and wooden molds, which preclude testing in a sufficiently timely fashion to meet business needs. In addition, the imprecision of this fabrication technique adds dimensional inaccuracy in the structure of on the order of tenths of inches; for a typical scale of 1 inch to 1000 feet, such inaccuracy corresponds to hundreds of feet in the surveyed region. As a result, not only is the simulation late, the results are also inaccurate to such an extent that one cannot determine if a deviation in the data is due to inaccuracy in the scale model, or truly due to inaccurate interpretation of the field data.

Of course, actual measurement of the finished scale model would allow accounting for dimensional inaccuracy of the model in analyzing the simulation data. However, actual measurement of the model must be performed in a non-contact manner so that the model can be useful after such measurement. Conventional non-contact measurement techniques, such as x-ray, CAT scan, or another imaging technique, are not only expensive, but are quite cumbersome for objects of the size of these models.

These prior models also have the distinct disadvantage of being single-use structures. This is due primarily to the imprecision of the molds used to form the model structure, which requires the layers in these models to be bonded together to form a single laminated structure. If simulation of the survey of a similar region of the earth is desired over varying physical properties for a given layer, each simulation iteration requires a completely new structural model. However, the presently-achievable accuracy in building such conventional models makes it impossible to repeat a model experiment with a new model structure which has only one feature changed. In addition, as noted above, the time and expense of constructing such a new model structure also prohibits such iterative analysis.

For the above-stated reasons, as well as others, little use is currently made of scale models for verification and correction of seismic surveys.

By way of further background, recent advances have been made in the field of the fabrication of parts from computer-aided design (CAD) data bases. A summary of these recent advances and techniques has been recently published in Wood, "Desktop Prototyping", Byte (May 1991), pp. 137–142, incorporated herein by reference.

An apparently useful method for the formation of prototype parts, noted in the Wood article, is commonly referred to as stereolithography. According to this method, the surface of a vat of curable resin is irradiated by a laser according to a cross-sectional layer of the part to be produced. The resin polymerizes, or cures, at the irradiated locations, forming a solid mass thereat. The mass is slightly lowered into the vat, and the surface is again irradiated according to the shape of the next cross-section of the part, again forming a polymerized mass at the surface which adheres to the preceding layer. The process continues in layerwise fashion, until the part is completed and at which time the uncured liquid is removed. This process is more completely described in U.S. Pat. No. 4,575,330, issued Mar. 11, 1986 and incorporated herein by this reference. Various models of apparatus for performing this process are now available from 3D Systems, Inc., such models including the SLA-190, SLA-250 and SLA500.

Other additive methods for producing parts from computer aided data bases are also now becoming available, as indicated in the Wood article noted hereinabove.

It is an object of this invention to provide a method of rapidly fabricating accurate scale models of the earth, so that seismic surveys may be timely verified and corrected.

It is a further object of this invention to provide a method of forming such models which allows for development of survey and data interpretation techniques.

It is a further object of this invention to provide a modular scale model so that efficient and inexpensive iteration of particular attributes of the model can be performed.

It is a further object of this invention to provide such a method which utilizes computer-aided design tools so that the construction of various structures can be readily implemented.

Other objects and advantages of the present invention will be apparent to those of ordinary skill in the art having reference to the following specification.

SUMMARY OF THE INVENTION

The invention may be incorporated into a method for modeling a portion of the earth using advanced part producing techniques of the additive type. A computer-aided design (CAD) data base is first created which specifies the structure of particular layers, and from which a prefabricated layer may be produced by an additive process such as stereolithography from a material having the desired physical properties. The model is constructed in layerwise fashion using such pre-fabricated layers; at locations where prefabricated layers are in contact, their precision is sufficient that no adhesive is necessary. Alternate layers may be provided by pouring or otherwise introducing a liquid between prefabricated layers or into voids within a prefabricated layer, and which may later be solidified or left in liquid form, depending upon the desired physical properties. Simulation of a seismic survey is then performed by imparting acoustic energy to the model and measuring its response. The present invention thus provides a precise model which allows for flexibility in its fabrication, making iterative simulation of a seismic survey practicable.

DETAILED DESCRIPTION OF THE PREFERRED EMBODIMENTS

Figure 1:
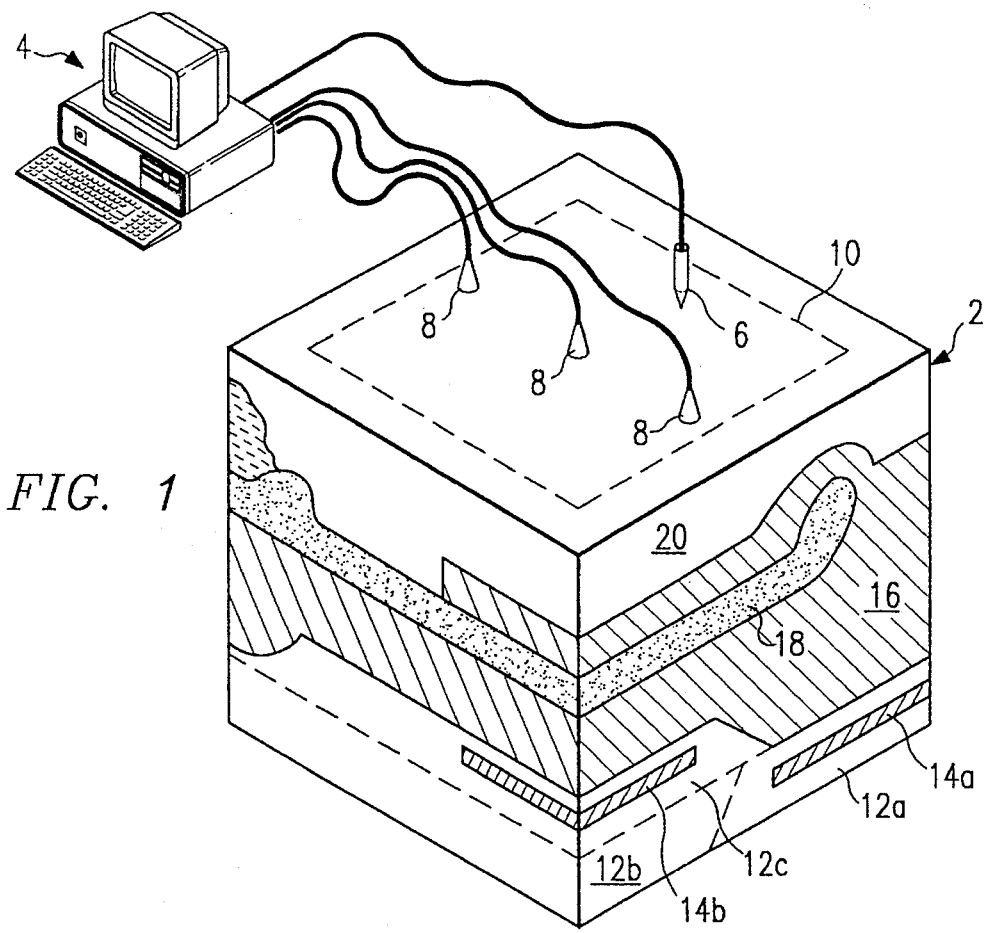
FIG. 1 is a perspective view of a model according to the preferred embodiment of the invention.

Referring now to FIG. 1, a perspective view of a simulation system according to the preferred embodiment of the invention will be described in detail. Scale model 2 corresponds to either an actual location of the earth or to an arbitrary set of geological conditions, and is fabricated as will be described hereinbelow. Model 2 includes multiple layers 12, 14, 16, 18, 20 selected to have different physical properties, such properties corresponding to layers found in the earth's crust, and to have shapes corresponding to actual or arbitrary subsurface geological structures. The below-described method of fabricating scale model 2 is sufficiently precise that the overall size of model 2 is contemplated to be on the order of 10 inches on a side, allowing for simulations to be performed on a desktop or a laboratory benchtop. The scaling for such a model will thus be on the order of one inch equal to two thousand feet.

As noted hereinabove, layers 12, 14, 16, 18, 20 are formed to have different physical properties, such as acoustic velocity. For example, the range of velocities contemplated by the present invention is from 1000 ft/sec to 18,000 ft/sec or greater. Many materials are available which are suitable for the construction of the layers as will be described hereinbelow, and which have the physical properties of interest. Examples of these materials are various two-part epoxies, rubbers and plastics, as well as other plastics such as PVC and ABS; other materials, such as low melting point metals, may also be used.

Model 2 includes layer 12 which is formed of prefabricated modular parts 12a, 12b, 12c, each of the same material. It is contemplated that conventional stereolithography and other modern prototype part fabrication techniques are sufficiently precise (with precision on the order of 0.005 inches) that modular parts 12a, 12b, 12c may fit together in the model without requiring an adhesive therebetween. As will be described in further detail hereinbelow, this enables the iterative simulation of a model by allowing substitution of differently shaped prefabricated modules without requiring reconstruction of model 2 in its entirety for each simulation.

As will be described in further detail hereinbelow relative to the construction of model 2 and alternative embodiments thereof, according to the present invention some layers are prefabricated, and others are poured or otherwise molded into locations of model 2 surrounded by prefabricated layers. For example, in model 2 of FIG. 1, layers 12, 18 and 20 are prefabricated by way of stereolithography or another process of sufficient precision for purposes of the simulation, and having defined voids therewithin (for the case of layers 14) or defined surfaces at which molded layers may be formed. In this example, molded layers 14a, 14b and 16 may be formed by pouring, injecting or otherwise introducing a liquid epoxy/catalyst combination into the locations defined by prefabricated layers 12, 18, 20, completing model 2.

While the use of prefabricated layers 12, 18, 20 within the end structure of model 2 is preferred according to this embodiment of the invention, it is also contemplated that, according to the present invention, prefabricated layers may be constructed which serve only as molds for some or all layers of model 2. For example, a prefabricated layer may be fabricated having a surface which defines the top surface of a molded layer. A liquid is then poured into the space adjacent the prefabricated layer, and solidified. The solidifying mechanism will depend upon the liquid used, and thus may be done by way of curing (e.g., if a resin is used), freezing, or other appropriate mechanism. The prefabricated layer is removed after solidification of the poured material, and the next prefabricated layer is placed therein to define the next molded, or poured, layer to be formed adjacent the prior molded layer, followed by its removal. The process according to this alternate embodiment of the invention continues molding each layer, until model 2 is complete by way of layerwise molding.

In either case, the purpose of model 2 is to provide a medium for the simulation of the response of a portion of the earth to seismic stimuli. According to this embodiment of the invention, vibration source 6 and one or more vibration detectors 8 are deployed at selected locations of the top surface of top layer 20 in model 2, or at selected fixed locations buried within model 2. In particular, an oil well may be modeled by the drilling or other formation of a small diameter hole from the surface of model 2, with a detector 8 or source 6 placed therewithin. Vibration source 6 and vibration detector 8 may each be any one of a number of conventional transducers or other similar apparatus for generating vibrations responsive to an electrical signal, and for generating an electrical signal corresponding to detected vibrations, respectively, such as conventional transducers available from Panametrics, Inc. Many conventional transducers are capable of performing both functions (i.e., source and receiver), and are typically used in solid, contact-type simulation using conventional molded models. It should be noted that source 6 and detectors 8 should be capable of generating and detecting, respectively, vibrations which are at relatively high frequencies, much higher than those used in actual field seismic surveys. This is because the structural features of model 2 are dimensionally scaled relative to the true geological features in the earth. Since the resolution of a seismic survey is determined by the frequency of the vibrations used, and since the resolution required for model 2 is much finer than that in the earth (by a factor of on the order of 10,000), the simulation frequency must similarly be much higher. Vibration frequencies in the ultrasonic range are contemplated to be useful in this embodiment of the invention.

As will be described in further detail hereinbelow, the simulation is accomplished by energizing source 6, and enabling detectors 8, at various locations of the top surface of or at selected locations within model 2, simulating a conventional seismic survey. It is preferred that the simulation data be acquired near the center of the top surface, for example within area 10, so that the sides of model 2 will be effectively infinitely distant from the paths of the vibrations and will not affect the simulation results. According to this embodiment of the invention, the energizing of source 6 and data acquisition from receivers 8 is under the control of a conventional computer 4, for example a personal computer workstation having the appropriate data acquisition capability. The detected vibrations are preferably stored in computer readable form, for analysis later in similar manner as for a conventional survey. Such analysis includes conventional techniques such as common midpoint (CMP) stacking, migration, normal move-out (NMO), dip move-out (DMO), and the like. As a result, a simulated seismic survey may be performed using model 2.

It should be noted that model 2 may be used to simulate either land-based or marine surveying. For the example of land-based surveying, top layer 20 of model 2 will be a solid of the desired physical property. For a simulated marine survey, model 2 may be constructed to have walls extending along the sides thereof, so that water or another liquid will serve as top layer 20, into and within which the vibrations may be generated and detected, respectively, simulating a marine survey.

While the example of FIG. 1 illustrates the provision of source 6 and receiver 8 which are separated from one another by some distance, the simulated survey may also be acquired in a zero-offset mode where the receiver and source are located at the same surface location. The zero offset vibration amplitude-versus-time trace will correspond to the result of CMP stacking of traces having varying offset distances. While zero-offset surveying is generally not achievable or useful in the field due to noise effects and the like, zero-offset data acquisition can be achieved in physical modeling, thereby eliminating many data processing steps.

According to another embodiment of the invention, it is contemplated that an ultrasonic wand such as used in sonography of the human body can be used in the simulation. Conventional sonography equipment, such as the "ATL" system available from Advanced Technology Laboratories of Seattle, Washington, includes a computer which produces high resolution ultrasonic waves of various types, and which includes sufficient image processing capability to provide a real-time image of the structure under analysis. In the "ATL" system, 128 source-receiver pairs are included within a wand, so that 128 channels with a form of zero-offset ultrasonic information is displayed in real time. According to this embodiment of the invention, it is contemplated that a real-time reflection image of model 2 can be provided from this type ("ATL" system) of zero-offset ultrasonic measurement, or from other types of zero-offset presentations. This image can be used as the simulation output, for verifying field data or for testing various analysis and survey techniques as will be described hereinbelow, or for measuring the actual sizes and locations of layers 12, 14, 16, 18 underlying the top layer 20 of model 2.

Figure 3:
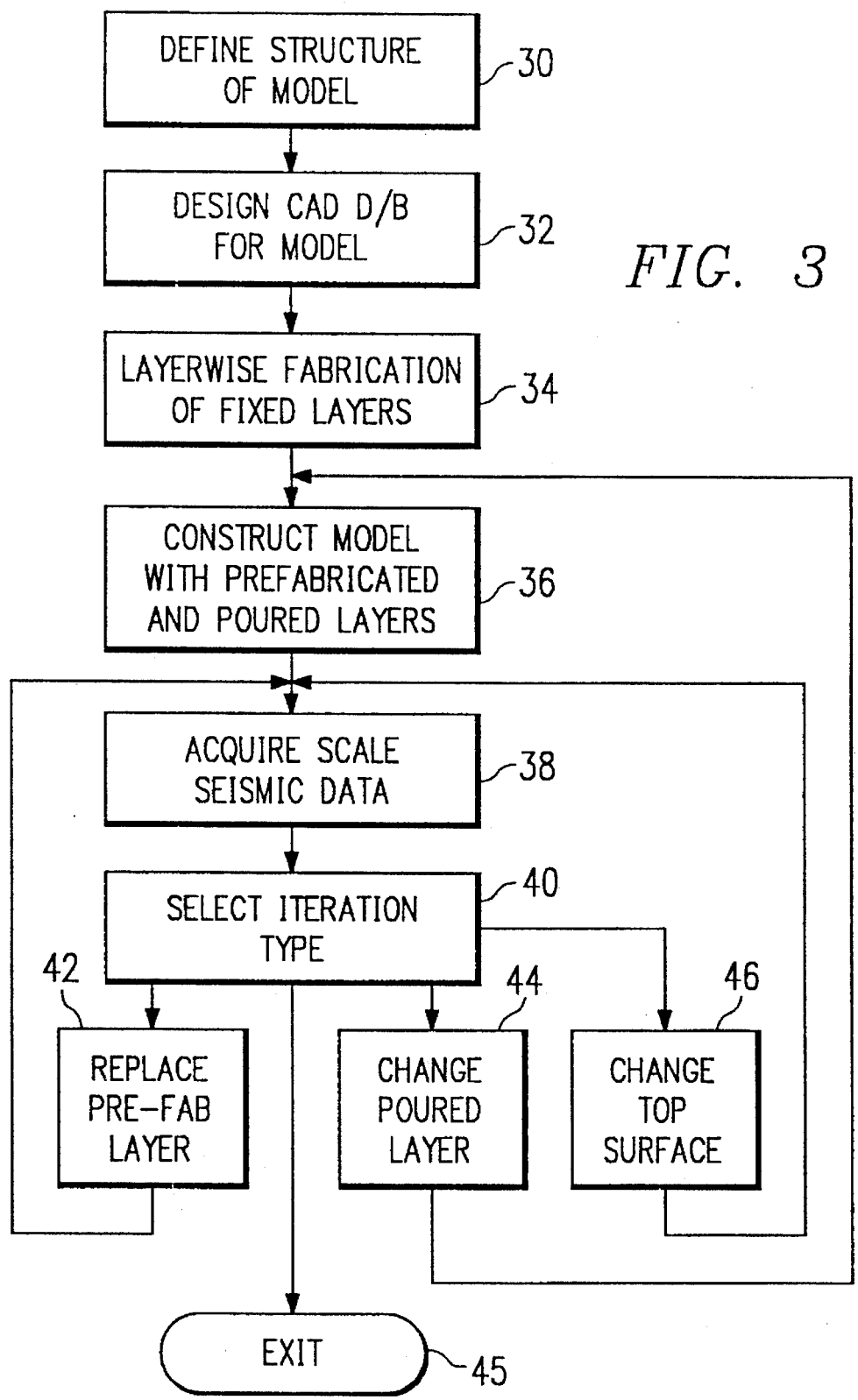
FIG. 3 is a flow chart illustrating the method of modeling according to the preferred embodiment of the invention.

Referring now to FIG. 3, the construction and use of a model to simulate a seismic survey according to the present invention will now be described in detail. In process 30, the geophysicist, geologist, or other person interested in the simulation defines the structure to be modeled. According to a first application of the present invention, the simulated seismic survey can be used to verify and correct the results of a field survey. In this application, the structure of the model will be defined to match the results of the field survey, for example as a scale model based upon a contour map or other survey output. The size and material of each layer in the model, and its estimated or measured physical properties, will be selected in order to most closely match that resulting from the seismic interpretation to be verified.

In another application of the present invention, the simulation can be used to characterize survey techniques. In this application, the size and velocities of the various layers in the model will not necessarily be selected to match an actual volume in the earth, but will instead be selected for their transmission, reflective or refractive effects on vibrations or acoustic waves. The effects of particular formations, of varying physical properties, on the ability to distinguish formations having other physical properties and wave propagation characteristics, may be determined by simulation according to this use of the invention.

Further in process 30, the model designer will determine which of the layers in the model will be prefabricated, and which are to be poured or otherwise formed within the model. Also in process 30, the model designer will determine which layers are to be formed modularly, similarly as layer 12 in FIG. 1, and will define the sizes and shapes of the modules in forming such layers.

After definition of the structure of the model, process 32 is performed in which the defined structure is realized in a computer data base. Conventional computer-aided design (CAD) programs are useful for generating a data base corresponding to the shape and dimensions of the particular layers to be formed herein. As described in the above-referenced Wood article, the preferred arrangement of the CAD data base to represent the layer to be formed, in three dimensions, is according to the STL (stereolithography) format, rather than as a conventional 3-D wireframe representation. This format facilitates the slicing of the 3-D data base object into layers. As will be noted hereinbelow, only those layers which are to be prefabricated by way of stereolithography or the like need be designed and stored in a CAD data base in process 32.

Process 34 prefabricates those layers of the model which are realized in the CAD data base in process 32. For purposes of the present invention, the precision of the formation of these layers is important not only for forming the desired modeled structure accurately, but also so that modules of a single layer may fit together without requiring adhesives to form an integral structure. Depending upon the particular experimental design, however, the interface between modules or layers may be dry, wetted, or bonded, as desired; the precision at which the prefabricated layers may be formed is sufficient, however, that bonding is not required except at those interfaces where the presence of the adhesive is part of the simulation experiment.

It is also important that the manufacturing time required for the prefabricated layers be quite short so as to be responsive to the simulation results. While spare layers are useful to some degree, the prefabricated layers will generally not need to be mass produced. Accordingly, the preferred method for fabricating the prefabricated layers is one which allows for direct translation of CAD data base information into a physical structure. Stereolithography, as noted hereinabove and as described in the above-referenced Wood article and U.S. Pat. No. 4,575,330, is a currently available fabrication technique which meets these needs.

According to the stereolithography process, the CAD data base generated in process 32, for a layer to be prefabricated, is effectively "sliced" into layers which are on the order of 0.005 thick. This slicing is performed by a computer resident in the fabrication apparatus such as the models SLA-190, SLA-250 and SLA-500 now available from 3D Systems, Inc. As is described, for example, in the above-referenced Wood article and U.S. Pat. No. 4,575,330), the stereolithography process forms a part in layerwise fashion, by curing selected portions of the surface of a vat of UV-curable liquid, with the selected portions corresponding to the cross-section of the article being formed. After curing the selected portion of the liquid at the surface, the cured portion is lowered into the vat by a distance corresponding to the thickness of the next cross-section to be formed (e.g., on the order of 0.005 inches), and the process is repeated for the next slice of the CAD data base, corresponding to the next layer to be formed. The process is repeated until the structure is complete. Accordingly, for each layer of model 2 which is to be prefabricated, process 34 will form each such layer in layerwise form from the sliced CAD data base from process 32. The result of process 34 will thus be one or more prefabricated layers of model 2.

It should be noted that alternative methods of forming the prefabricated layers in model 2 from a CAD data base may also be used in the present invention, including those described in the Wood article noted hereinabove. These methods include the selective laser sintering process available from DTM Corporation, in which the structure is formed in layerwise fashion by the sintering of a layer of powder according to a cross-section of the structure being formed; subsequent layers of powder are deposited over the part (with the part being lowered in the chamber by the thickness of the next layer to be formed) and sintered according to the other cross-sections. Other similar methods, as noted in the Wood article, may also be used in connection with the present invention.

After formation of the prefabricated layers in process 34, the construction of model 2 in process 36 can begin. This process of building model 2 according to the preferred embodiment of the invention will now be described relative to FIGS. 2a through 2e. While FIGS. 2a through 2e illustrate cross-sectional views of an outside surface model 2, it is of course contemplated that the shape of the various layers within model 2 will vary, so that cross-sectional views in planes parallel to those of FIGS. 2a through 2e will differ from one another, as suggested by FIG. 1. It should be noted that model 2 is preferably formed onto a surface 3, which may be the surface of a table or a portable surface such as a pallet, flat metal plate, or the like.

Figure 2A:
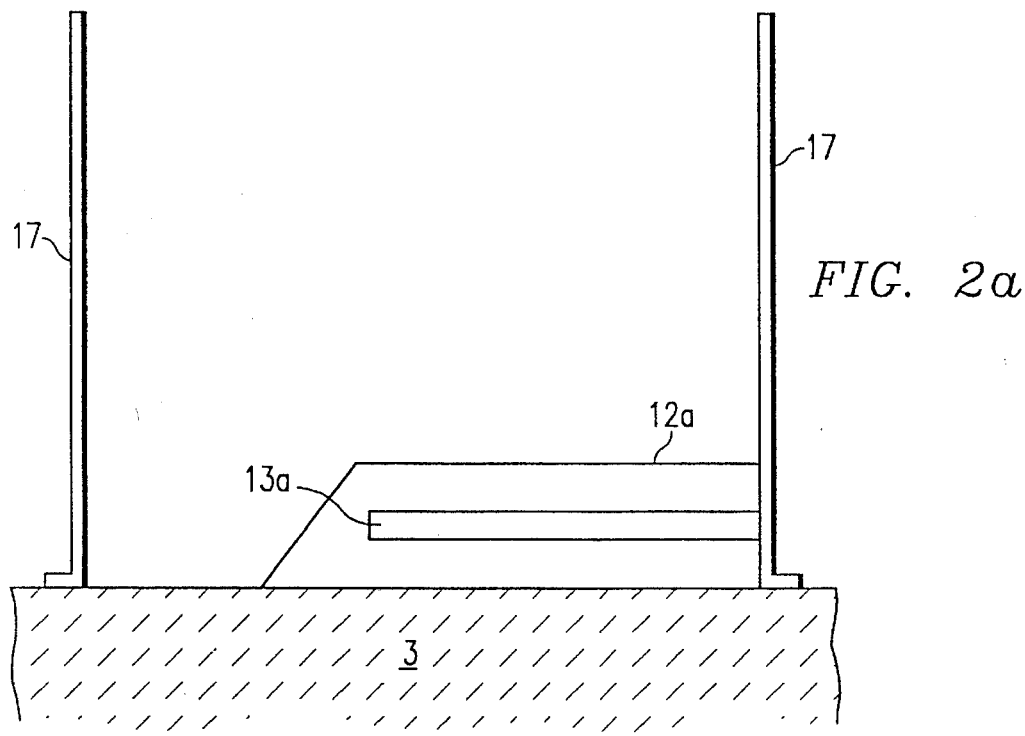
FIGS. 2a through 2e are cross-sectional diagrams illustrating the construction of the model of FIG. 1.

Referring first to FIG. 2a, layer module 12a is placed into the desired position on surface 3. Since module 12a is the first part of model 2 to be placed, its particular position is arbitrary. The placement of module 12a on surface 3 may fix its position, by way of an adhesive therebetween to hold module 12a in place; alternatively, particularly if the ability to substitute another module therefor is desired, module 12a may be merely loosely placed without bonding. To ensure proper alignment of module 12a and subsequent layers, however, it may be desirable to provide form 17, as shown in FIG. 2a, or some other positioning element against which module 12a may be placed. It is contemplated that such positioning of module 12a will be apparent to those of ordinary skill in the art.

In this example, layer module 12a is prefabricated by way of stereolithography or an equivalent process as described hereinabove. The material used for module 12a will depend upon the particular physical properties desired therefor, and upon the capability of the stereolithography process. Certain materials are known to be useful in stereolithography and which have physical properties useful in the simulation method according to the present invention. Examples of these materials are Ciba-Geigy XB 5134-1 with an acoustic velocity of 5050 ft/sec, and Ciba-Geigy XB 50811 with an acoustic velocity of 6939 ft/sec. In addition, as illustrated in FIG. 2a, layer module 12a includes a notch 13a into which a poured or injected material may later be formed, as will be described hereinbelow.

Figure 2B:
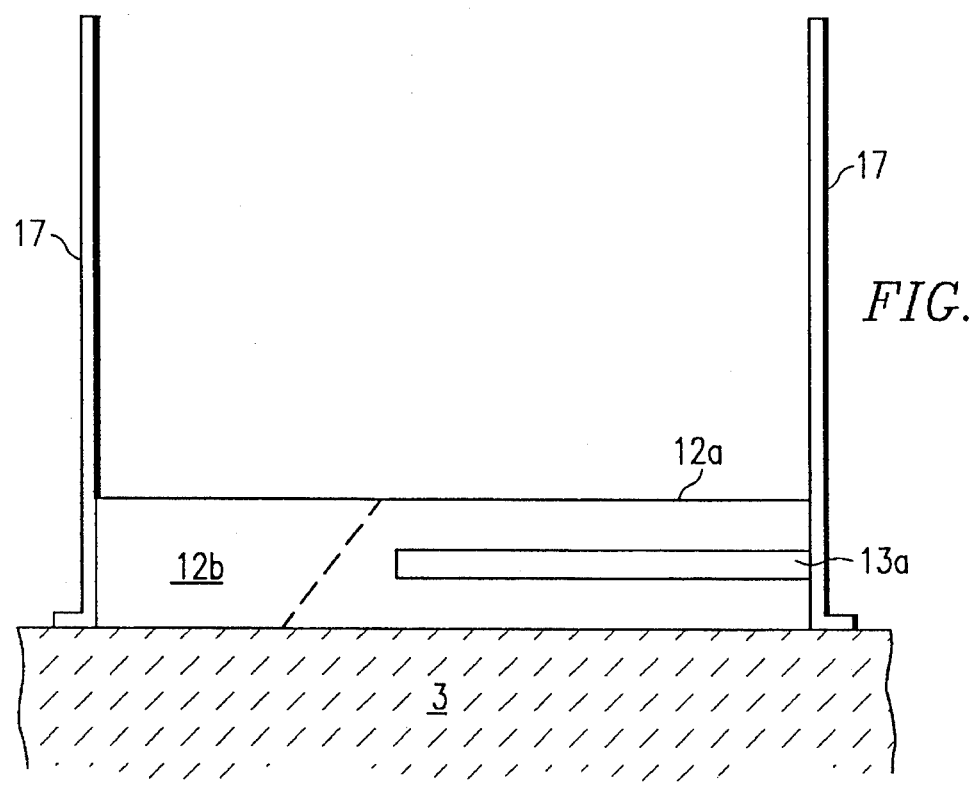

FIG. 2b illustrates model 2 after the placement of second layer module 12b. Module 12b is similarly prefabricated as described above of the same (or different, if desired) material as module 12a, to have a shape which mates with module 12a. According to the above-described processes for prefabricating structures, it is contemplated that the precision of manufacture of modules 12a and 12b relative to one another is sufficient that no adhesive will be necessary therebetween to fill an air gap or other interfacial void. It should be noted that the structure of FIG. 2b may alternatively be prefabricated as a unitary layer, rather than as modules 12a and 12b. However, the modular formation of this portion of model 2 allows for replacement of module 12b with another module, as will be described hereinbelow, allowing for iterative simulation of a seismic survey.

Figure 2C:
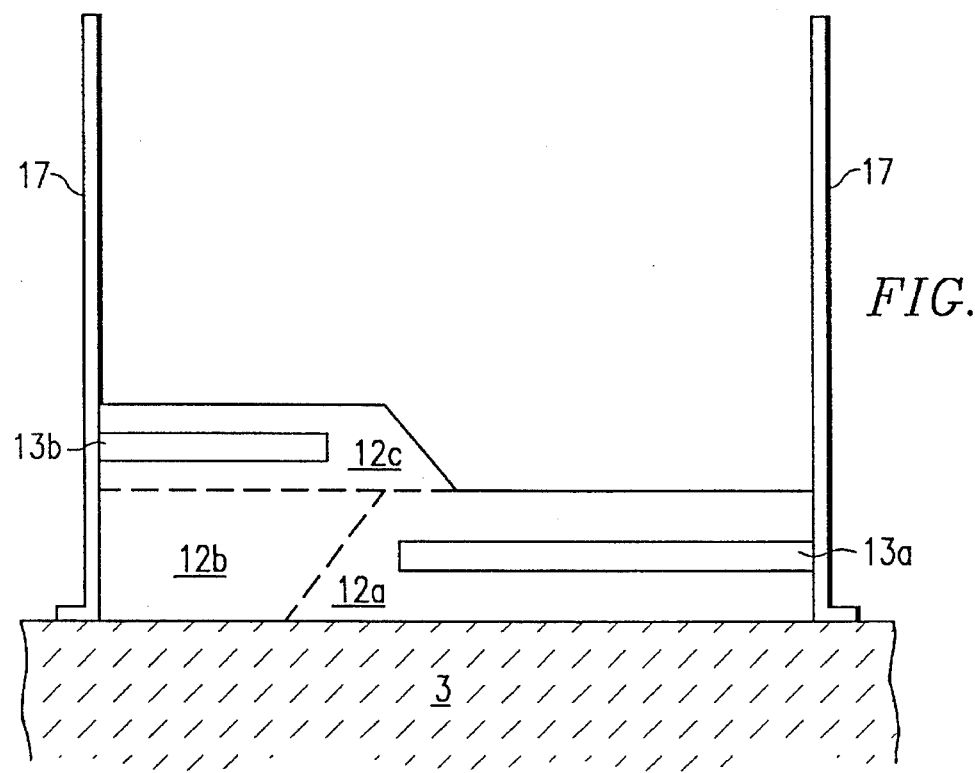

Referring now to FIG. 2c, the structure is illustrated after placement of layer module 12c over modules 12a, 12b, completing the formation of model layer 12. Layer module 12c is similarly prefabricated from the same material as modules 12a, 12b, and of sufficient precision as to fit over the surface without adhesive. Layer module 12c also includes therein notch 13b (shown as a slot, but which may have any arbitrary shape as desired by the simulation) which will receive a poured or injected material to form a molded layer therewithin.

Figure 2D:
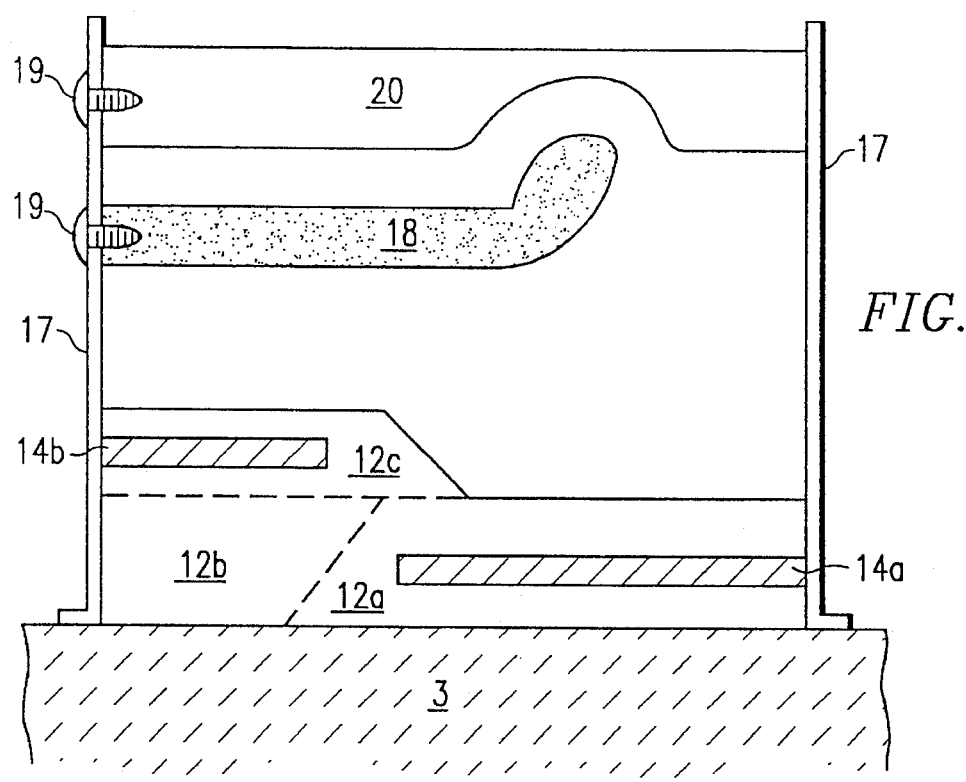

Referring now to FIG. 2d, the formation of additional molded layers within and over layer 12 will now be described. Forms 17 are disposed along the sides of the structure, to hold a liquid layer poured thereinto. The preferred method of introducing material into voids 13 within layer 12 is to turn the structure on its side, remove one of the forms 17, and pour the material into the void 13 from the side of the structure; of course, other techniques for introducing the liquid, including pouring from the top down, injection, and other readily apparent techniques, may be used.

As illustrated in FIG. 2d, layers 14a and 14b are in place within notches 13a and 13b in layer modules 12a and 12c, respectively. In this example, layers 14a and 14b model layers having one or more different physical properties than surrounding layer 12, and accordingly are formed of a different material than that of layer 12; of course, layers 14a and 14b may alternatively be formed of the same material as layer 12, if desired. It is preferable that layers 14a, 14b be introduced into notches 13a, 13b in liquid form to ensure complete filling without voids.

The preferred material for layers 14a, 14b is preferably a two-part epoxy/catalyst combination which will solidify into a layer having the desired physical properties. For example, the Emerson-Cuming Stycast 2651 system has an acoustic velocity of 9100 ft/sec when cured, and the Hysol R9-2039/3561 system has an acoustic velocity of 8300 ft/sec when cured. Alternatively, a material which is not to be solidified may be introduced by way of pouring or injection into notches 13, where layers 14 are to be modeled as liquids; examples of liquids useful in this example of the invention include water and low velocity oils. Further in the alternative, materials which solidify by way of other mechanisms, such as freezing, may be introduced in liquid form and subsequently solidified.

Alternatively, it should be noted that layers 14a, 14b may be molded into notches 13a, 13b, respectively, prior to construction of model 2. In this case, prefabricated layer modules 12a, 12c would include prefabricated layers 14a, 14b formed thereinto prior to construction of the model. Indeed, several modules 12a, 12c may be prefabricated, each with different material for layer 14a, 14b, respectively, and with differently shaped layers 14a, 14b. The use of prefabricated layer modules thus allows for off-the-shelf model construction, and also for iteration of the model as will be described in further detail hereinbelow.

Still referring to FIG. 2d, prefabricated layers 18 and 20 are also placed into the desired locations of model 2, prior to the formation of a poured or molded layer therewithin. Prefabricated layers 18, 20 are formed in the same manner as layer 12, by way of stereolithography or an equivalent technique, and of a material having the desired physical properties for this location of model 2. As illustrated in FIG. 2d, prefabricated layers 18, 20 are fixed at their desired position by screws 19 or other fasteners through form 17 on one side thereof; it is preferable that layer 20 is not screwed to forms 17 on at least one side of model 2, to facilitate removal of the form for the pouring of a liquid into model 2.

Figure 2E:
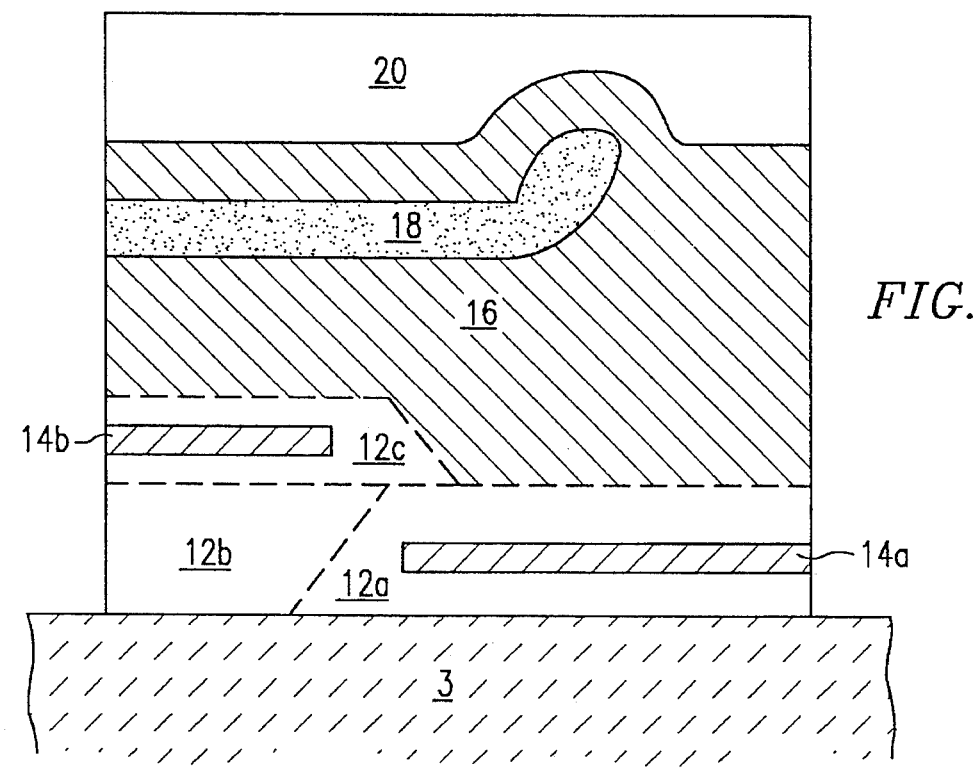

Referring now to FIG. 2e, model 2 is illustrated after the formation of poured layer 16 thereinto, completing this example of model 2. According to this example, poured layer 16 surrounds prefabricated layer 18, and is between prefabricated layer 12 and prefabricated layer 20. Poured layer 16 is also preferably a two-part epoxy/catalyst system as noted hereinabove, which will cure into a solid layer having the physical properties desired for this portion of model 2. As in the other layers, the physical properties of importance for such modeling include acoustic velocity (compressional, horizontal shear, vertical shear), density, and other elastic properties of the material. After its introduction, poured layer 16 is solidified in the conventional manner for the material, or left in liquid form if desired for the simulation of interest.

Of course, alternative methods of pouring layer 16 into model 2 may be used. For example, a first portion of layer 16 may be poured over layer 12 to the depth corresponding to the bottom surface of layer 18, and solidified prior to the placement of prefabricated layer 18. Prefabricated layer 18 may then be placed upon the first portion of poured layer 16, followed by the pouring of the remainder of layer 16 thereover. In addition, prefabricated layer 20 may be fixed above the lower layers in some manner, for example by way of support legs extending to the lower layers 12, 18, or from forms 17. In the alternative to pouring layer 16 into model 2 from the side, an opening may be provided through prefabricated layer 20 through which liquids may be poured. If such artifacts as openings and supports are used, they should be located near the edges of model 2 so that the simulation is not affected.

As noted hereinabove, an alternative technique for constructing model 2 according to the present invention includes the use of prefabricated layers as molds, rather than as the layers in the model themselves. According to this alternative, the physical properties of the material of the prefabricated layers is not important, other than its ability to define the shape of a poured layer adjacent thereto. For example, as discussed hereinabove relative to FIG. 2e, prefabricated layer 20 defines the shape of poured layer 16 adjacent thereto. According to this alternative where prefabricated layer 20 would serve as a mold, prefabricated layer 20 would be removed after the solidifying of layer 16, and another layer poured over solidified layer 16. As noted hereinabove, the solidification mechanism for layer 16 will depend upon the material, such mechanisms including curing and freezing. The next poured layer may be itself defined by another prefabricated layer placed above solidified layer 16 and serving as a mold, if desired. According to this alternative, prefabricated layers may be used as molds (and subsequently removed) in the fabrication of some, or even all, layers of the model, depending upon the materials available and the simulation design.

Referring back to FIG. 3, process 38 in the simulation according to the present invention is now performed, in which source 6 (see FIG. 1) is energized to provide high frequency vibrations into model 2 from the surface of layer 20, and in which receivers 8 detect the vibrations after reflection from the various layers 12, 14, 16, 18 in model 2. Computer 4 is operable to receive the data, write the data to storage or tape and, if desired, process it according to conventional seismic data analysis routines, for comparison against field seismic data (in the case where model 2 is defined from a contour map of an actual earth volume) or for other analysis.

Based on the results of the simulation of model 2 of FIG. 1 (i.e., the cross-section illustrated in FIG. 2e), various choices regarding the iteration of the simulation are available according to the present invention (process 40). A first choice is, of course, to cease the simulation effort (exit 45), similarly as with prior models as noted hereinabove. However, due to the construction of model 2 according to the present invention other actions are available, in a timely and cost-effective manner, by which the simulation results may be interpreted or otherwise improved.

Figure 4:
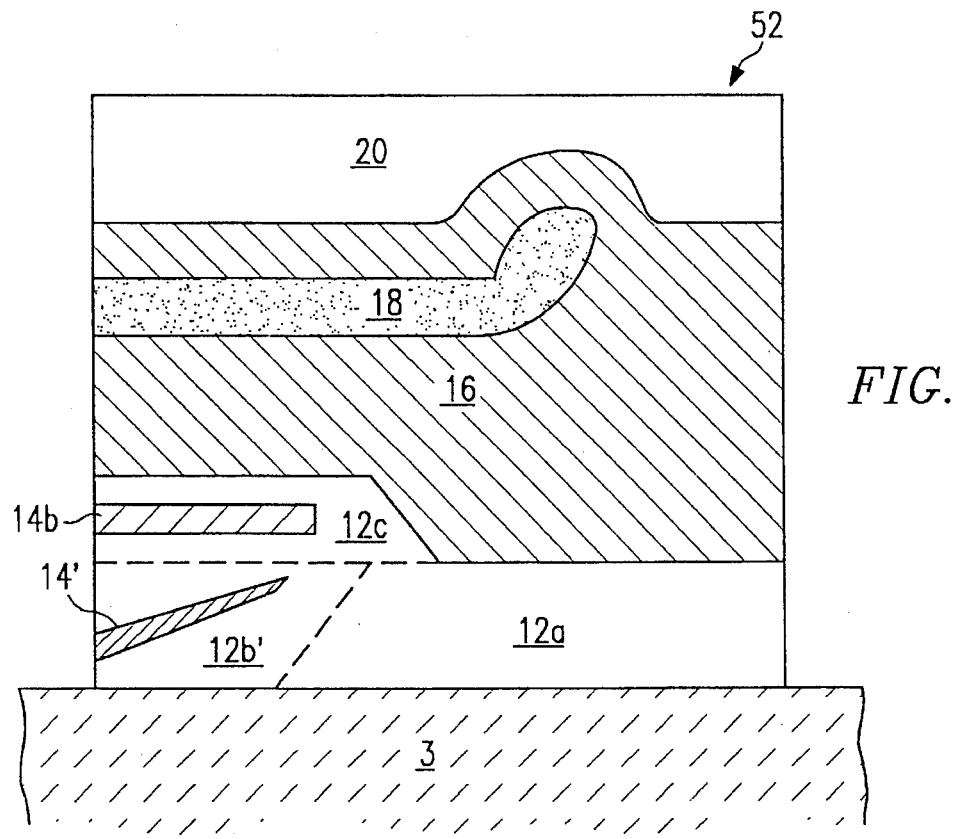
FIGS. 4 through 9 are cross-sectional diagrams illustrating changes in the model of FIG. 1 which allow for iterative modeling and simulation.

Referring now to FIG. 4, the result of process 42 is illustrated, in which all or part of one or more of the prefabricated layers is replaced. Model 52 of FIG. 4 is similar to model 2 of FIG. 2e, but includes new layer modules 12a' and 12b'. Layer 12a' is a prefabricated module of similar material as layer 12a described hereinabove (if desired), but does not have notch 13a formed thereinto for receiving layer 14a. Accordingly, in this example of substituting layer module 12a' for layer module 12a, and again obtaining simulated seismic data, the effect of layer 14a on the simulated seismic data can be determined. Such an iteration would be useful in characterizing or testing the data analysis routines by which subsurface formations (modeled by layer 14a), particularly those containing hydrocarbons, can be distinguished in the seismic survey.

It should be noted that layer 12a in model 2 of FIG. 2e may be bonded to layer 16 formed thereover, depending of course upon the material selected for layer 16. In such a case, it may be necessary to reconstruct model 52 in its entirety in order to substitute layer 12a' for layer 12a. As indicated above relative to the prior model techniques, such reconstruction effectively prevented such substitution. However, according to the present invention, the processes used to prefabricate layers 12, 18, 20 in models 2, 52 are inexpensive, precise, and fast. As a result, even in the worst case where the model 52 must be fully constructed in order to substitute a layer from one iteration to another, such reconstruction is inexpensive and may quickly be done, making the iterative process useful in the simulation.

Referring still to FIG. 4, however, the modular construction of layer 12, where no adhesive is required between modules, allows substitution of molded layers without construction of model 52 in its entirety (process 44). As noted hereinabove, prefabricated layer 12b is placed into model 2 without adhesive relative to layers 12a and 12c with which it is in contact. As a result, layer 12b may be easily removed from the side of model 2, and replaced with another layer 12b' as shown in FIG. 4 which has a layer 14' formed thereinto as in model 52. Layer module 12b' is a prefabricated module, having the same external shape as module 12b, but with a notch formed thereinto for allowing the molding of a layer 14' therewithin of the desired material. Because the precision of the prefabrication process described hereinabove is sufficiently high (on the order of 0.005 inches), layer modules 12b and 12b' may be readily interchangeable without requiring an entire model 52 to be constructed.

The ability to substitute layer module 12b' for module 12b allows the simulation to determine if a layer 14', for example having physical properties similar to a hydrocarbon reservoir, can be distinguished by a particular survey configuration using a particular data interpretation routine, given the effects of layers 14b, 16, and 18 thereabove. In this way, the present invention would be useful in the development of survey techniques such as source and receiver placement, processing algorithm evaluation, and seismic data interpretation techniques. Such iterative analysis is not practicable using prior modeling techniques, as indicated hereinabove. Multiple modules 12b may be fabricated with varying layers 14' therewithin, so that several simulation runs with varying shape and materials for molded layer 14' may be readily executed.

Figure 5:
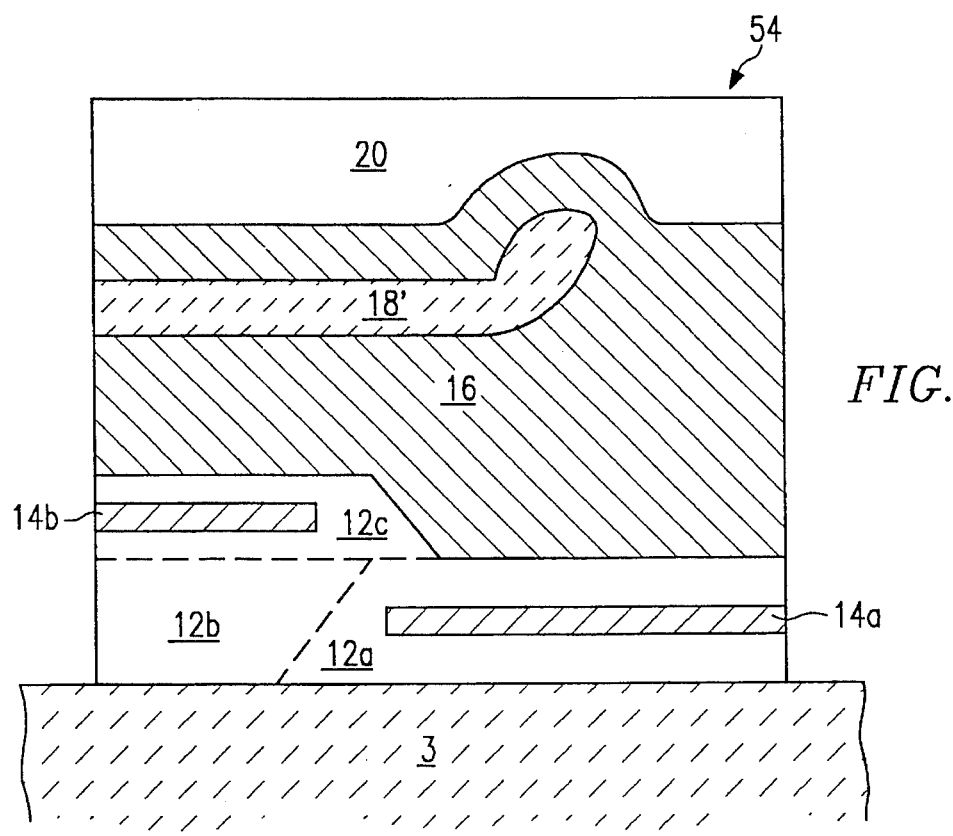

Referring now to FIG. 5, yet another example of the substitution of a prefabricated layer in process 42 is illustrated, particularly a change in material for layer 18 (now shown as layer 18' in model 54 of FIG. 5). As is well known in the art, the acoustic impedance of subsurface layers and formations is an important factor in being able to distinguish the presence of a layer thereunder, as the reflectivity of a layer increases with its acoustic impedance contrast. For example, the acoustic impedance and shape of layer 18 is a significant factor in the ability to detect layer 14b lying thereunder. In the development of survey and data interpretation techniques, the ability to simulate a survey over a range of impedances and shapes of layer 18 is extremely useful.

Figure 6:
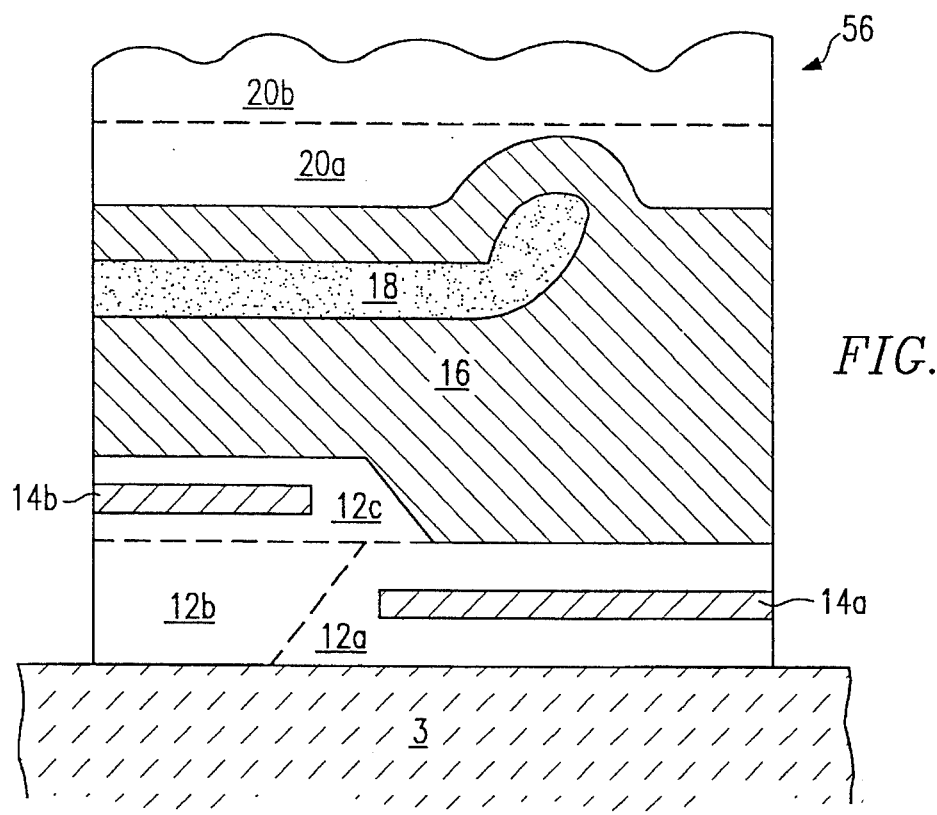

Referring to FIG. 6, another choice of iteration, namely change in the top surface (process 46 of FIG. 3), using substitution of a prefabricated layer is illustrated. In Figure 6, model 56 includes top prefabricated layer 20 which has two portions, modules 20a and 20b. Module 20a is the lower module in contact with layer 16 thereunder; module 20b fits on top of module 20a, and has an undulating surface. Similarly as noted hereinabove for new layers 12a' and 12b', modules 20a and 20b may replace an entire layer 20, requiring construction of model 56 in its entirety (which, according to the present invention, would be feasible). However, if layer 20 of FIG. 2e were modular (in this example, consisting of two modules with a flat interface therebetween), the flat upper surface of layer 20 could be replaced with the undulating upper module 20b illustrated in FIG. 6. It is contemplated that variations in the upper surface will be particularly useful in an iterative simulation according to the present invention, as such surfaces greatly affect seismic data.

According to the example of FIG. 6, model 56 is constructed in similar manner as model 2, only with the material of prefabricated layer 18' having different physical properties from layer 18, for which the prior simulation run was performed. Comparison of the simulation results of each case will provide insight into the robustness of the survey or interpretation technique used.

Figure 7:
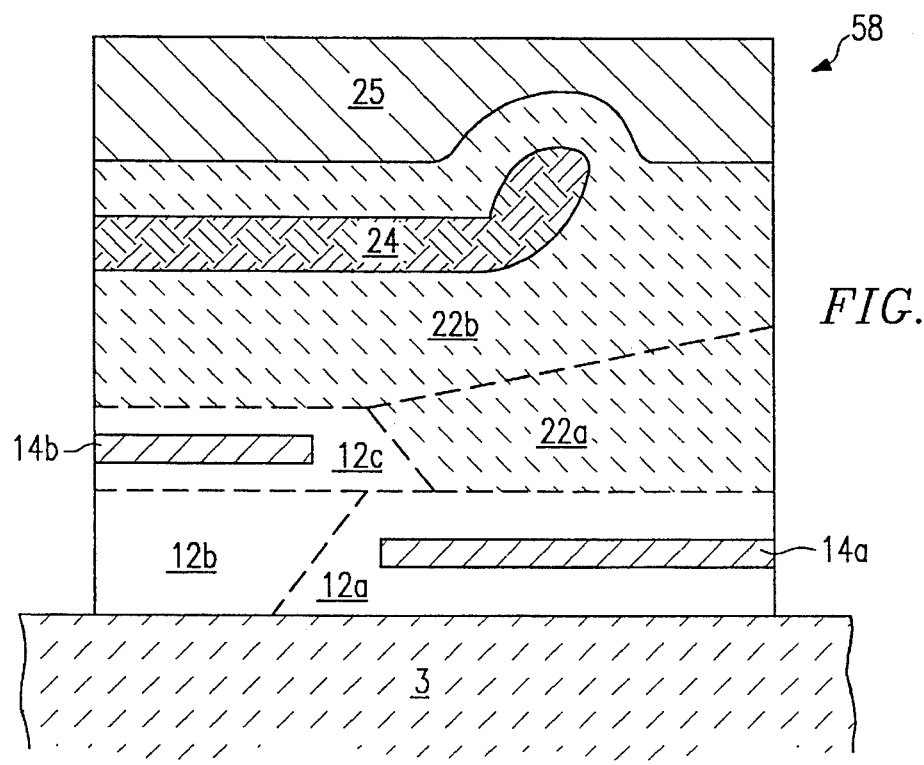

Referring now to FIG. 7, another example of the present invention will be described relative to model 58. In this example, molded layer 16 of model 2 is replaced with prefabricated modular layer 22 in model 58, and prefabricated layer 18 of model 2 is replaced with molded layer 24 in model 58. Layer 22 includes modules 22a and 22b, with a notch formed within module 22b to receive molded layer 24 therewithin. It should be noted that the shapes of layers 22, 24 may be the same as layers 16, 18 in the prior example, illustrating that the selection of which layers are to be prefabricated and which are to be molded need not depend upon the structure of the model, but may be determined according to the simulation plan to facilitate iteration of simulation runs.

According to the example of model 58 in FIG. 7, prefabricated module 22a may be formed to sufficient precision that it can fit with modules 12a, 12c without adhesive, even where formed of different material than that of modules 12a, 12c. Prefabricated module 22b is also sufficiently precise as to mate with module 22a without adhesive. Top layer 25 may be molded in this example, poured into the region above the top of module 22b after construction thereof; alternatively, layer 25 may also be prefabricated. It is contemplated that materials may be selected for layers 22, 24, 25 in model 58 which match, in terms of acoustic velocity and other physical properties, those of layers 16, 18, 20 in model 2 of FIG. 2e; as a result, the selection of prefabricated versus molded layers is contemplated to be quite wide-ranging.

Figure 8:
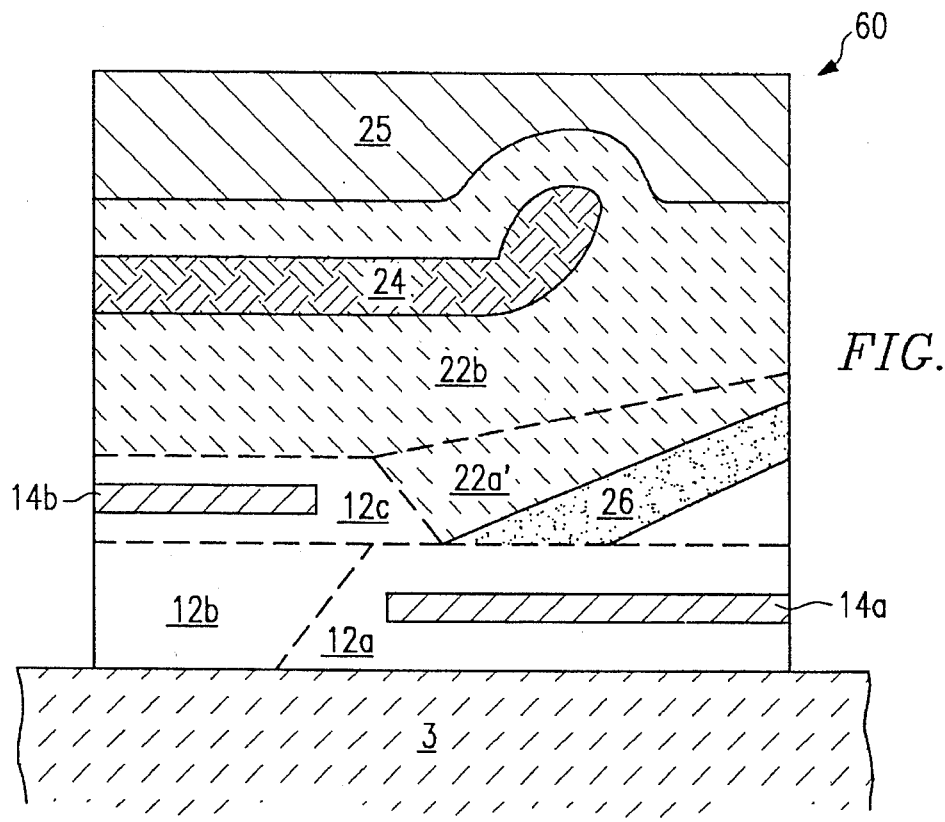

Referring now to FIG. 8, model 60 is illustrated which in which module 22a of FIG. 7 is replaced with module 22a'; module 22a' includes a slot thereinto for receiving molded layer 26. Since modules 22a, 22a' are not bonded to adjacent layers 12a, 12c, 22b, it is contemplated that this substitution may be made while maintaining the remainder of the layers in place.

Figure 9:
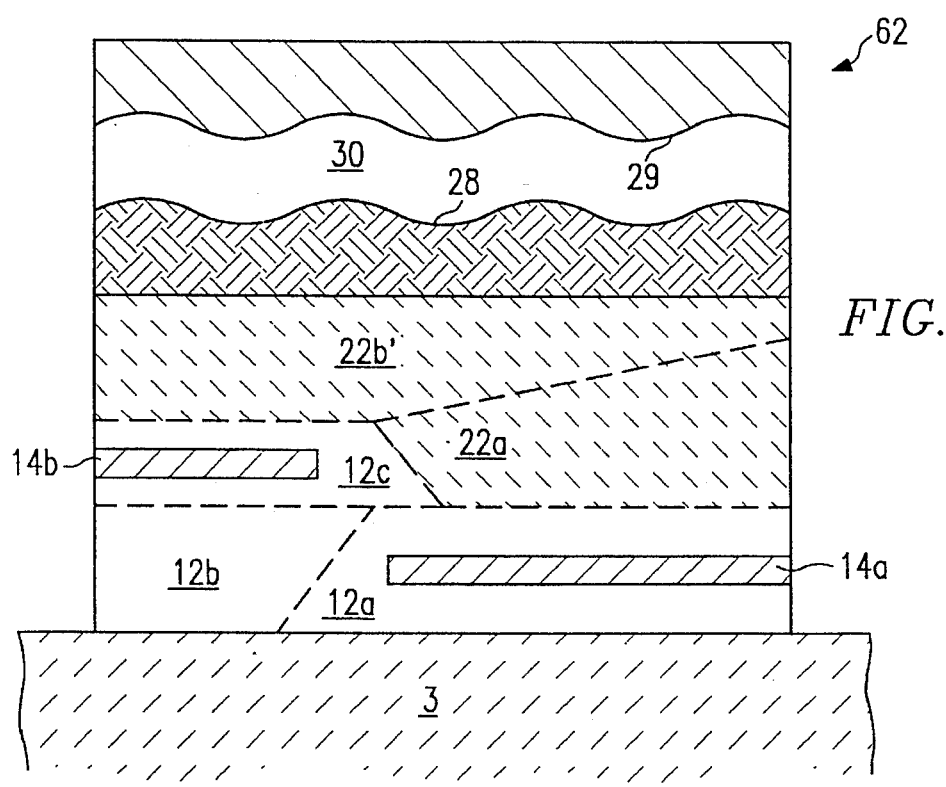

Referring now to FIG. 9, model 62 is illustrated which corresponds to another iteration of the top surface (process 46 of FIG. 3), relative to model 58 of FIG. 7. According to the present invention, it is contemplated that it is particularly easy to substitute top layers, especially with prefabricated layer modules 22b, 22b' not bonded to the underlying layers (e.g., module 22a). According to the example of FIG. 9, a complex upper surface including prefabricated layers 28, 30 and poured molded layer 29 may readily be placed upon removal of layer module 22b of FIG. 7 and replacement with layer module 22b' of FIG. 9. The upper surface may then be constructed either of prefabricated layers, molded layers, or both, and a new iteration of the simulation performed.

According to the present invention, as described relative to the process of FIG. 3 and the examples of iterative construction illustrated relative to FIGS. 4 through 9, the present invention provides sufficiently flexible and efficient construction that timely and accurate verification and adjustment of field data interpretations may be made. In addition, the ability to readily substitute layers for one another provides the capability of seismic survey and data interpretation development from the simulations, such capability not available with prior models due to their cost, inaccuracy, and slow construction. As a result, trial and error may be used in the laboratory context, rather than in the field, greatly reducing the costs of seismic surveying and exploration and greatly increasing the ability to efficiently produce oil and gas from the earth.

While the invention has been described herein relative to its preferred embodiments, it is of course contemplated that modifications of, and alternatives to, these embodiments, such modifications and alternatives obtaining the advantages and benefits of this invention, will be apparent to those of ordinary skill in the art having reference to this specification and its drawings. It is contemplated that such modifications and alternatives are within the scope of this invention as subsequently claimed herein.

We claim:

1. A method of constructing a model of the earth for simulating a seismic survey, comprising:
   storing, in a computer data base, information corresponding to a plurality of model layers;
   fabricating said plurality of model layers from said stored information, first and second ones of said plurality of model layers being in solid form and having acoustic velocities differing from one another; and
   after the fabricating step, stacking said plurality of model layers, including said first and second ones of said plurality of model layers, in a preselected order.

2. The method of claim 1, further comprising:
   introducing a liquid into a void in the first one of said plurality of model layers, said liquid having an acoustic velocity different from that of said first one of said plurality of model layers.

3. The method of claim 1, further comprising:
   introducing a liquid into a void in said first one of said plurality of model layers; and
   solidifying said introduced liquid to form a molded layer, wherein the solidified liquid has an acoustic velocity different from that of said first one of said model layers.

4. The method of claim 3, wherein said stacking step stacks said plurality of model layers onto a surface;
   and wherein said introducing and solidifying steps are performed prior to said stacking step.

5. The method of claim 1, further comprising:
   introducing a liquid adjacent to a surface of said first one of said plurality of model layers, after the stacking of said first one of said plurality of model layers, said liquid having an acoustic velocity different from that of said first one of said plurality of model layers.

6. The method of claim 1, further comprising:
   introducing a liquid adjacent to a surface of said first one of said plurality of model layers, after the stacking of said first one of said plurality of model layers; and
   solidifying said introduced liquid to form a molded layer, prior to the stacking of said second one of said plurality of model layers thereover.

7. The method of claim 5, wherein said introducing step introduces said liquid between said first and second ones of said plurality of model layers.

8. The method of claim 7, further comprising: solidifying said introduced liquid.

9. The method of claim 8, further comprising: after said solidifying step, removing said second one of said plurality of model layers.

10. The method of claim 1, wherein a first one of said model layers comprises first and second modules; and wherein said stacking step comprises:
    placing said first module;
    placing said second module onto and in contact with said first module.

11. The method of claim 10, wherein said step of placing said second module is performed without adhesive between said first and second modules.

12. The method of claim 1, wherein said fabricating step is performed by stereolithography.

13. A method of constructing a model of the earth for simulating a seismic survey, comprising:
    storing, in a computer data base, information corresponding to a plurality of model layers;
    fabricating said plurality of model layers, in solid form, from said stored information;
    placing a first model layer, in solid form, in a selected position;
    pouring a first liquid into a region of said model adjacent said first model layer to form a molded layer thereat;
    solidifying said first liquid; and
    after said solidifying step, removing said first model layer.

14. The method of claim 13, further comprising:
    after said step of removing said model layer, placing a second model layer, in solid form, in a selected position; and
    pouring a second liquid, having an acoustic velocity different from that of the solidified first liquid, into a region of said model between said solidified first liquid and said second model layer.

15. The method of claim 13, further comprising:
    after said step of removing said first model layer, placing a second model layer, in solid form, in a selected position; and pouring a second liquid into a region of said model between said solidified first liquid and said second model layer; and solidifying said second liquid, the solidified second liquid having an acoustic velocity different from that of the solidified first liquid.

16. The method of claim 15, further comprising:

after said step of solidifying said second liquid, removing said second model layer.

* * * * *